United States Patent
Hankins et al.

(10) Patent No.: US 12,169,664 B2
(45) Date of Patent: *Dec. 17, 2024

(54) COVERT SPORTS COMMUNICATION SYSTEM

(71) Applicants: John Andrew Hankins, Carlsbad, CA (US); Craig Anthony Filicetti, Scottsdale, AZ (US)

(72) Inventors: John Andrew Hankins, Carlsbad, CA (US); Craig Anthony Filicetti, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,847

(22) Filed: Jan. 3, 2024

(65) Prior Publication Data

US 2024/0220189 A1      Jul. 4, 2024

Related U.S. Application Data

(63) Continuation of application No. 17/562,626, filed on Dec. 27, 2021, now Pat. No. 11,893,307.

(Continued)

(51) Int. Cl.
*G06F 3/16* (2006.01)
*A63B 71/06* (2006.01)
(Continued)

(52) U.S. Cl.
CPC .......... *G06F 3/165* (2013.01); *A63B 71/0622* (2013.01); *H04R 3/00* (2013.01);
(Continued)

(58) Field of Classification Search
CPC ................ G06F 3/165; A63B 71/0622; A63B 2071/063; A63B 2102/18; A63B 2225/50; H04R 3/00; H04R 2420/07
(Continued)

(56) References Cited

U.S. PATENT DOCUMENTS 4,203,595 A    5/1980   Thompson
4,536,739 A    8/1985   Nobuta
(Continued)

FOREIGN PATENT DOCUMENTS

JP    6030223 A       2/1985
JP    2006229373 A    8/2006
(Continued)

OTHER PUBLICATIONS

International Search Report and Written Opinion issued Feb. 16, 2021 in PCT/US2020/060893.
(Continued)

*Primary Examiner* — Thjuan K Addy
(74) *Attorney, Agent, or Firm* — NovoTechIP International PLLC

(57) ABSTRACT

A covert sports communication system has a transmitter configured to wirelessly transmit coded audio track selection signals. The system includes a receiver that may be worn within headgear. The receiver includes stored audio tracks and is configured to receive coded audio track selection signals from the transmitter, decode the audio track selection signals, and play at least one stored audio track in accordance with the decoded audio track selection signals. The audio tracks may include audio instructions to a participant of a sporting event.

20 Claims, 14 Drawing Sheets

Related U.S. Application Data

(60) Provisional application No. 63/259,031, filed on Jun. 15, 2021, provisional application No. 63/207,437, filed on Feb. 26, 2021.

(51) Int. Cl.
*H04R 3/00* (2006.01)
*A63B 102/18* (2015.01)

(52) U.S. Cl.
CPC ..... *A63B 2071/063* (2013.01); *A63B 2102/18* (2015.10); *A63B 2225/50* (2013.01); *H04R 2420/07* (2013.01)

(58) Field of Classification Search
USPC .................................. 381/77, 78, 79, 85, 80
See application file for complete search history.

(56) References Cited

U.S. PATENT DOCUMENTS

| | | | |
|---|---|---|---|
| 5,461,371 | A | 10/1995 | Matsumoto et al. |
| 5,984,810 | A | 11/1999 | Frye et al. |
| 6,285,757 | B1 | 9/2001 | Carroll et al. |
| 6,301,367 | B1 | 10/2001 | Boyden et al. |
| 6,652,284 | B2 | 11/2003 | August et al. |
| 6,728,518 | B1 | 4/2004 | Scrivens et al. |
| 7,110,552 | B1 | 9/2006 | Saliterman |
| 8,126,143 | B2 | 2/2012 | Daniel et al. |
| 8,156,571 | B2 | 4/2012 | Barzilla |
| 8,201,274 | B2 | 6/2012 | Ellis |
| 8,279,051 | B2 | 10/2012 | Khan |
| 8,666,075 | B2 | 3/2014 | Daniel et al. |
| 8,793,321 | B2 | 7/2014 | Williams |
| 8,964,980 | B2 | 2/2015 | Daniel |
| 9,071,901 | B2 | 6/2015 | Black |
| 9,129,541 | B2 | 9/2015 | Weiler et al. |
| 9,485,573 | B2 | 11/2016 | Black |
| 9,757,068 | B2 | 9/2017 | Cantrell |
| 10,080,950 | B2 | 9/2018 | Kelley |
| 10,532,266 | B2 | 1/2020 | Genova |
| 10,951,747 | B2 | 3/2021 | Black |
| 11,266,897 | B1 | 3/2022 | Charalambides et al. |
| 2001/0002928 | A1 | 6/2001 | Cummins |
| 2002/0132211 | A1 | 9/2002 | August et al. |
| 2005/0049080 | A1 | 3/2005 | Hovington |
| 2005/0170870 | A1 | 8/2005 | Goldenberg et al. |
| 2005/0212202 | A1 | 9/2005 | Meyer |
| 2005/0228866 | A1 | 10/2005 | Endler et al. |
| 2006/0025206 | A1 | 2/2006 | Walker et al. |
| 2007/0290801 | A1 | 12/2007 | Powell |
| 2008/0153557 | A1 | 6/2008 | Matveev |
| 2008/0206723 | A1 | 8/2008 | Hunter |
| 2008/0268913 | A1 | 10/2008 | Heikkinen |
| 2010/0080390 | A1 | 4/2010 | Daniel |
| 2011/0190048 | A1 | 8/2011 | Walthour |
| 2011/0246579 | A1 | 10/2011 | Williams |
| 2012/0122069 | A1 | 5/2012 | Coleman |
| 2013/0052943 | A1 | 2/2013 | Black |
| 2014/0064511 | A1 | 3/2014 | Desai |
| 2014/0119554 | A1* | 5/2014 | Chan .................. H04R 1/1091 381/74 |
| 2016/0158639 | A1 | 6/2016 | Cantrell |
| 2016/0322078 | A1 | 11/2016 | Bose et al. |
| 2017/0065872 | A1 | 3/2017 | Kelley |
| 2017/0144024 | A1 | 5/2017 | Warners et al. |
| 2017/0372564 | A1 | 12/2017 | Amelio et al. |
| 2018/0043229 | A1 | 2/2018 | Stemle |
| 2018/0234190 | A1 | 8/2018 | Rauhala |
| 2018/0294893 | A1 | 10/2018 | Pedersen et al. |
| 2019/0391254 | A1 | 12/2019 | Asghar et al. |
| 2021/0225141 | A1 | 7/2021 | Petrillo |
| 2023/0009354 | A1 | 1/2023 | DeCarlo |
| 2023/0196770 | A1 | 6/2023 | Anton et al. |
| 2023/0410507 | A1 | 12/2023 | Hall et al. |

FOREIGN PATENT DOCUMENTS

| | | |
|---|---|---|
| JP | 2009159447 A | 7/2009 |
| WO | 2015196246 A1 | 12/2015 |
| WO | 2021113073 A1 | 6/2021 |

OTHER PUBLICATIONS

International Preliminary Report on Patentability issued Jun. 16, 2022 in PCT/US2020/060893.
International Search Report and Written Opinion issued Jun. 28, 2022 in corresponding PCT/US2021/065370.
Non-Final Office Action issued Nov. 16, 2023 in U.S. Appl. No. 17/562,626.
Notice of Allowance issued Dec. 14, 2023 in U.S. Appl. No. 17/562,626.
International Search Report and Written Opinion issued Jan. 25, 2023 in PCT/US2022/047163.
Non-Final Office Action issued May 31, 2024 in U.S. Appl. No. 18/606,378.
https://armillatech.com/.
https://gamedaysignals.com/.
"Inception" by ProMystic, product release 2018, see https://promystic.com and https://www.penguinmagic.com/p/13973.
Non-Final Office Action issued Jun. 3, 2024 in U.S. Appl. No. 18/606,804.
Final Office Action issued Aug. 26, 2024 in U.S. Appl. No. 18/606,804.

* cited by examiner

COVERT SPORTS COMMUNICATION SYSTEM

CROSS-REFERENCE TO RELATED APPLICATION

This application is a continuation of U.S. patent application Ser. No. 17/562,626, filed Dec. 27, 2021, which claims the benefit of priority to U.S. Provisional Patent Application No. 63/207,437, filed Feb. 26, 2021, and entitled "Baseball Pitch Selection Communication System," and U.S. Provisional Patent Application No. 63/259,031, filed Jun. 15, 2021, and entitled "Covert Sports Communication System," the disclosures of which are incorporated herein by reference in their entirety.

TECHNICAL FIELD

The present disclosure relates generally to a communication system for communicating with an athletic participant in a secure and covert manner.

BACKGROUND

In many sports, communication between players, or between coaches and players, is both allowed and desirable. For example, in the game of baseball, pitchers will throw a variety of pitches including fastballs, curveballs, sliders, and changeups. Fastballs are thrown relatively straight, and as the name implies, are thrown at the highest velocity among the pitcher's repertoire of pitches. A curveball is generally thrown at a lower velocity with a high rate of sidespin, so that the ball approaches the batter with a more curving trajectory. A slider is between a fastball and a curve, as it is a faster pitch than a curveball, but less than that of a fastball, with a sharper break towards the end of the pitch. A changeup is the slowest of pitches. There are yet other types of pitches, such as but not limited to a knuckleball, a forkball, and a splitter. Pitchers may not be able to throw all these different types of pitches but may be able to throw some subset of these pitches.

While it is very difficult to hit a baseball thrown by a major league pitcher in any event, it is much easier for a major league batter to hit a pitch if they know what type of pitch is coming, i.e., whether the pitch will be a fastball, curveball, slider, or other type of pitch. The batter can time the pitch more effectively, as well as anticipate the trajectory of the pitch and alter his swing to match the incoming pitch. On the other hand, it is important for the catcher to know what pitch is coming, because it is very difficult to catch a major league pitch that is a different type than the one expected. In other words, if a catcher is expecting a curveball, and the pitcher unexpectedly throws a fastball, the speed of the fastball can surprise the catcher and cause him to miss the ball or even get injured.

Accordingly, since the early days of baseball, catchers have communicated with pitchers to select which pitch to throw. The catcher has usually signaled using the fingers of their throwing hand to indicate the pitch selection. Their fingers are normally held pointing downwardly between their legs when the catcher is in his crouch. This shields the opposing team from seeing the pitch signal. A pitch selection signal may be one finger for a fastball, two for a curve, etc. The pitcher is able to see the catcher's fingers and know which pitch to throw. Unfortunately, an opposing player standing on second base is able to see the signals as well. If the runner is able to decode the signal, he can send a visual signal to the batter to indicate what type of pitch is coming. To combat this from happening, a catcher will run through a series of pitch signals with his fingers in a code.

Although catchers use codes to try to prevent anyone from stealing the signals, the visual nature of the signals allows anyone able to see the signals to decode the finger signals. It is a time-honored tradition for players on second base to try to decode the signals, but in recent years, more advanced means have been rumored to have been employed to ascertain the pitch selection. There has been suspected sign stealing using video to provide a team employee the ability to view the catcher's finger signals and provide an audible or other signal to the batter to indicate the suspected pitch selection, such as by a whistle to indicate a fastball instead of a curve, for instance. As baseball is a tradition-minded sport, the use of video and cameras and communication with the dugout to indicate the other team's pitch selection is considered a form of cheating. Furthermore, as baseball games become longer and longer (the average game length has significantly increased over the years, threatening fan interest), the running through of multiple signals for each pitch in an effort to prevent or hinder decoding of the pitch selection adds quite a bit of time to each game, in the tens of minutes.

Covert communications are not limited to baseball. For example, football has tried all sorts of different ways for players, especially quarterbacks, to receive plays from the coaches on the sidelines. Players were shuttled in and out, carrying the play calls from the coach to the quarterback, who would then announce the play call in the team huddle. Teams then started using hand signals to tell the quarterback what play to call. Finally, the National Football League allowed limited radio headset communication between the coach and the quarterback to call the plays. This system has used a traditional audio voice transmission to the quarterback to an audio voice receiver in the quarterback's helmet. Coaches wearing microphones on the sidelines will usually cover their mouths with clipboards to prevent lip reading. Quarterbacks have complained about the weight of the batteries needed to power their receivers. Also, none of the other players know what the play call is until the quarterback tells them the play.

Still other sports have communications between coach and athlete, such as swimming. Voice radio communication devices have been devised for a coach to provide swimming directives to swimmers. Such devices are relatively bulky, and also rely on voice communication.

Other sports, such as horse racing and hockey, have eschewed the use of audio communications to the participants. It may be useful, for example, to inform a jockey of his horse's position in the race, and other horses coming up from behind. Of course, such use of communications would need to be legalized by the authorities overseeing such sports.

SUMMARY

There is a need for a secure communication system that allows instructions to be selected and communicated to an athlete while keeping competing athletes from hearing those instruction.

This and other needs are met by a covert sports communication system that has a transmitter configured to wirelessly transmit coded audio track selection signals. The system includes a receiver worn within headgear having stored audio tracks. The receiver is configured to receive the coded audio track selection signals, decode the audio track selection signals and play at least one stored audio track in accordance with the decoded audio track selection signals, the audio tracks containing audio instructions to a sporting participant.

These needs are also met by a system for remotely communicating audio instructions, comprising a transmitter and a receiver. The transmitter includes a transmitter unit that transmits wireless signals and a microcontroller coupled to the transmitter unit. The transmitter microcontroller is configured to provide the transmitter unit with a selection signal to wirelessly transmit. The receiver includes: a receiving unit configured to wirelessly receive the selection signal; a memory configured to contain a plurality of stored audio instructions; an audio reproduction transducer configured to audibly reproduce the stored audio instructions; and a microcontroller coupled to the receiving unit, the memory and the audio reproduction transducer. The microcontroller is configured to control the memory and the audio reproduction transducer to reproduce a selected audio instruction in accordance with the received selection signal.

The earlier stated needs are also met by a baseball pitch selection communication system, comprising a pitch selection transmitter and a wireless receiver. The pitch selection transmitter includes buttons for selecting pitch types to be heard at a remote receiver, a microcontroller coupled to the buttons to receive a pitch type selection signal from the buttons and generate a coded signal in accordance with the pitch type selection signal, and a transmitter unit coupled to the microcontroller to receive the coded signal and transmit a coded wireless signal. The wireless receiver includes a receiving unit configured to receive the coded wireless signal, a microcontroller coupled to the receiving unit to decode the coded wireless signal and determine an audio track containing audio of the pitch type in accordance with the pitch type selection signal, a memory coupled to the receiver microcontroller and containing addressable storage locations in which audio tracks are stored, and a speaker coupled to the receiver microcontroller. The receiver microcontroller retrieves the audio track at the addressable storage location in memory at which the audio track containing the audio of the pitch type in accordance with the pitch type selection signal is stored and plays the audio track through the speaker.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
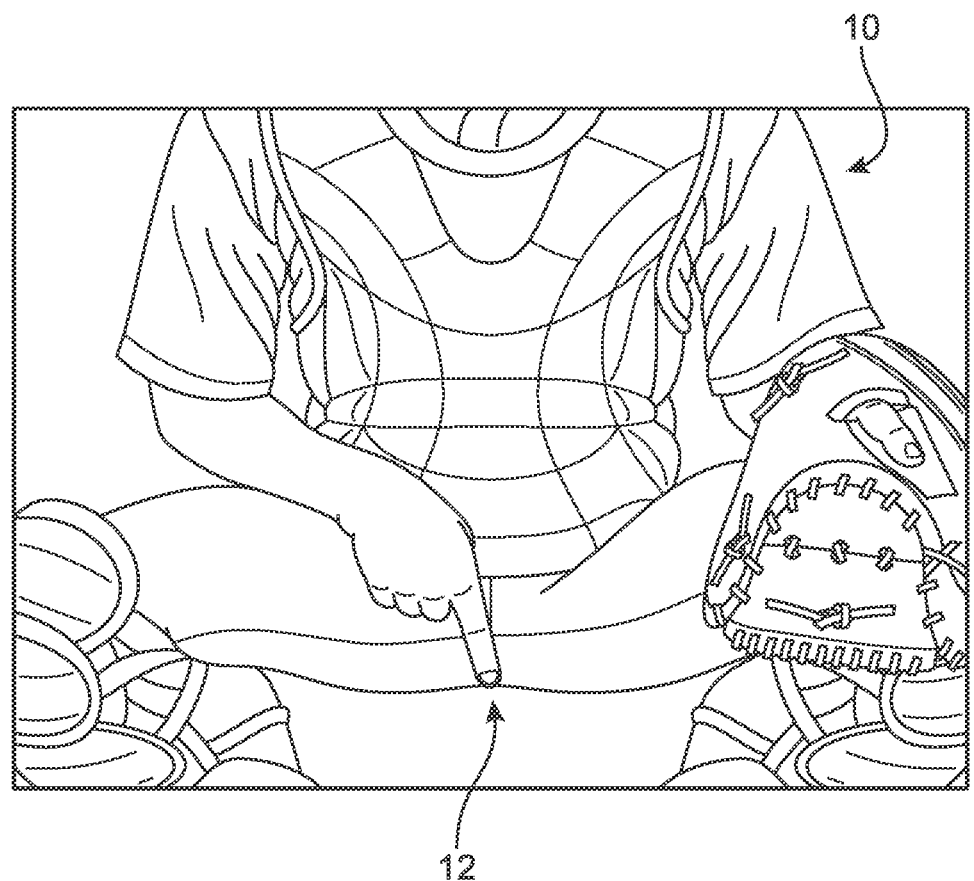
FIG. 1 is a rough depiction of a portion of a catcher providing a pitch signal using a finger, in accordance with prior methodologies.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, well-known structures and components are shown in block diagram form in order to avoid obscuring the concepts of the subject technology.

Techniques for providing a secure communication system that allows instructions to be selected and communicated are provided. These techniques may be used to communicate with an athlete during a sporting event while preventing competing athletes from overhearing these instructions. These techniques may be used in various sporting events to send instructions to an athlete during the sporting event from a coach, manager, or even another player who may wish to convey instructions to another player without inadvertently divulging these instructions to opposing players. The secure communication system may include a transmitter having various form factors. The transmitter may be worn by a player, coach, manager, or other user that may provide instructions to another player or players wearing a corresponding receiver configured to receive the instructions from the transmitter. The transmitter may also have a handheld form factor that may be larger than the form factor of the transmitter that may be worn. This larger form factor may enable the transmitter to include additional controls and user interface elements, such as but not limited to a display, which may be unavailable for some implementations of the transmitters that may be worn. The transmitter may provide various means for a user to send instructions to a player or players wearing a corresponding transceiver. Some implementations of the transmitter may include a set of buttons that are mapped to a predetermined set of instructions. For example, the transmitter used in baseball may include a set of buttons mapped to a set of pitches, and a button may be pressed on the transmitter to send a corresponding command to a receiver worn by the pitcher. The mapping of the buttons to specific commands may be configurable and the transmitter may be configured to multiple configurations suitable for use by multiple different players. The transmitter furthermore is configured to encode the signals sent to the transmitter to prevent the signals from being intercepted and understood by a competitor. The receiver may also be configured to utilize conductive sound to advantageously reduce the likelihood that competitors may overhear the instructions received from the transmitter. These and other technical benefits of the techniques disclosed herein will be evident from the discussion of the example implementations that follow.

FIG. 1 illustrates a pitcher's view of bottom half of a baseball catcher 10 while the catcher 10 is providing a pitch selection signal in accordance with the prior art. As can be recognized, the catcher 10 is in a squatting or crouched position, the front of the catcher 10 facing the pitcher. The catcher 10 will extend one or more fingers 12 (in this case, one finger) to indicate the pitch type that the catcher desires the pitcher to throw. For example, one finger may mean the pitch type is a fastball. The problem with this method, however, is that not only will a runner on second base be able to view this signal, but so can anyone with binoculars, a camera, etc., having a similar view of the catcher 10 as the pitcher. Anyone watching on television, or thousands of fans in the stadium, for example, will have such a view, and can steal the pitch type signals.

Figure 2:
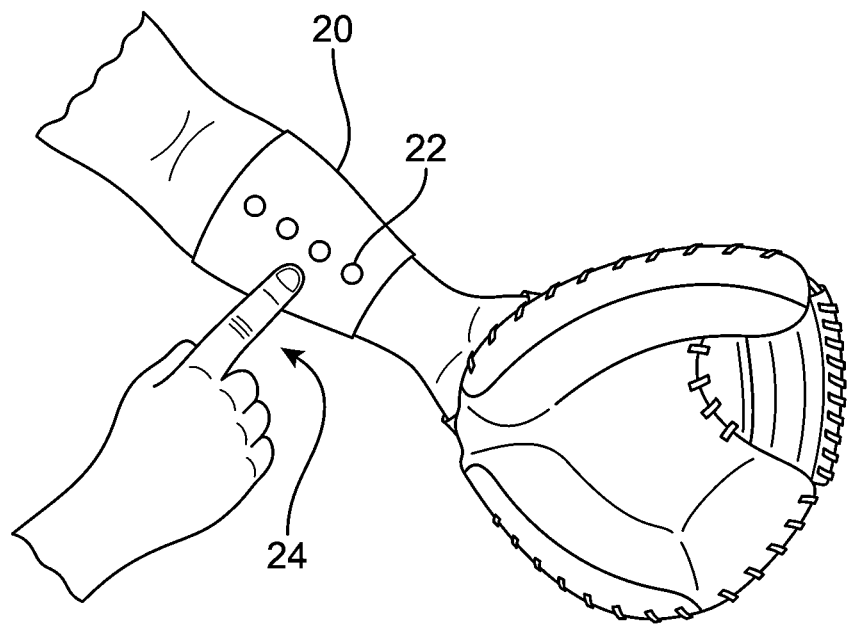
FIG. 2 is a view of a transmitter of the present disclosure.

A transmitter 20 constructed in accordance with embodiments of the present disclosure is depicted in FIG. 2. In the example implementation shown in FIG. 2, the transmitter 20 is shown attached to the forearm of the glove arm of the catcher 10. However, the transmitter 20 may be provided anywhere on the body of the catcher 10, or on the catcher's equipment, such as his glove. As will be discussed later, transmitters 20 are not limited to provision to catchers 10, but can be provided to managers, pitching coaches, or others. The transmitter 20 illustrated in FIG. 2 includes a number of buttons 22 that are actuatable by the catcher 10 to select and transmit a pitch type. The buttons 22 may be individually labeled with the pitch type, such as fastball, curve, etc. In FIG. 2, the buttons 22 are simply labeled A, B, C and D so that the buttons may be easily reassigned to different pitches without confusing the catcher. Although four buttons are illustrated in this example implementation, fewer or greater numbers of buttons 22 can be provided on the transmitter 20. In certain embodiments, such as a transmitter used by a coach, the transmitter 20 may include a display (not shown). Information, such as the selected pitcher, settings, and the pitch called, can be displayed on the display of the transmitter 20.

The throwing hand 24 of the catcher 10 may depress one of the buttons 22 on the transmitter 20 while the forearm of the gloved hand of the catcher 10 is facing the catcher's chest. This would prevent anyone but the catcher 10 from seeing which button 22 was depressed, and hence, which pitch type was selected. As will be explained in greater detail later, the depressing of a particular button 22 will cause a coded signal indicating a pitch type selection to be transmitted. Furthermore, in some implementations, the transmitter 20 may be configured such that a combination of buttons 22 may be depressed to cause the transmitter 20 to send the coded signal indicating a pitch type to be transmitted.

Figure 3:
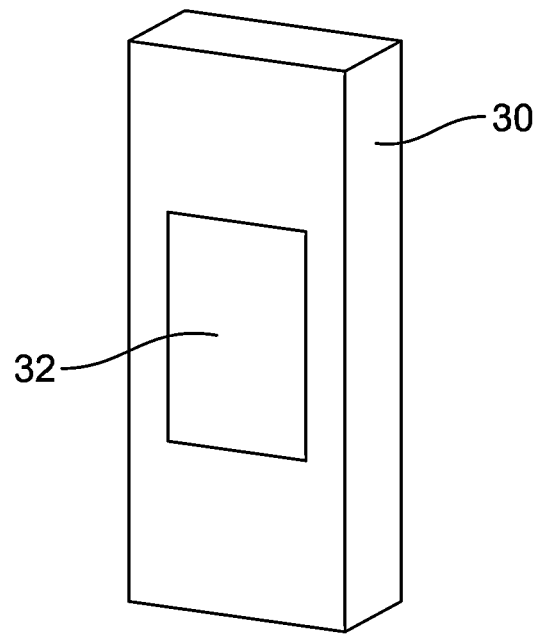
FIG. 3 is a perspective view of a receiver constructed in accordance with embodiments of the present disclosure.

An embodiment of a receiver 30 is depicted in FIG. 3. The receiver 30 may be configured to receive the coded signals transmitted by the transmitter 20 and to provide a signal perceptible to a user, such as a pitcher, which indicates a type of pitch that was selected by a user of the transmitter 20. As indicated in the preceding examples, this user may be the catcher, coach, or another person who may select a pitch type to be thrown by the pitcher. The receiver 30, according to certain embodiments, has a bone conductor 32 configured to transduce signals to produce a perceptible audible signal to a person. Other embodiments may include other means for providing audible, haptic, and/or other feedback to the pitcher or other user of the receiver 30. More details on the receiver will be provided later.

Figure 4A:
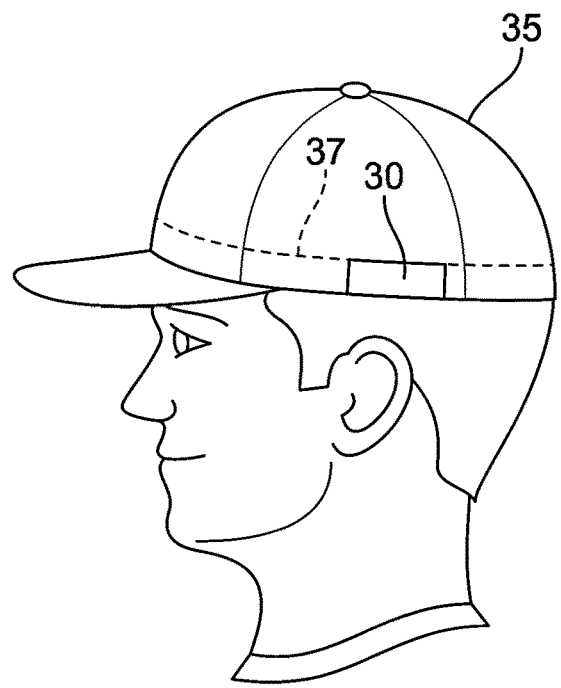
FIGS. 4A and 4B show the receiver of FIG. 3 installed in a baseball hat, in accordance with embodiments of the present disclosure.
Figure 4B:
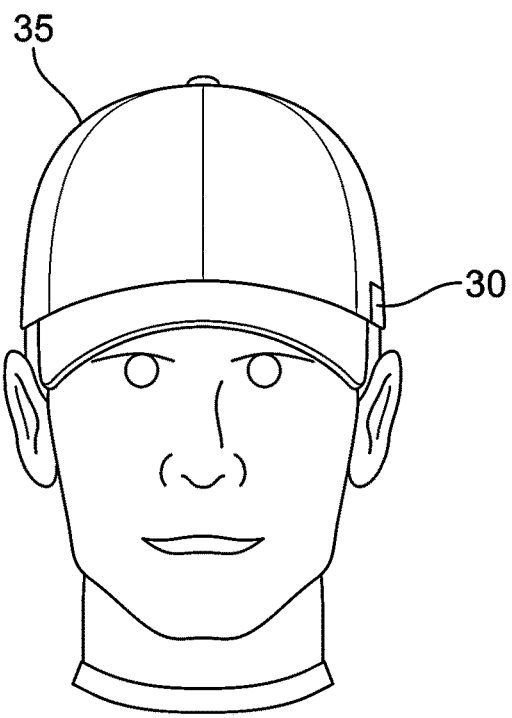

FIGS. 4A and 4B show an example implementation in which the receiver 30 of FIG. 3 is installed in a baseball hat 35 in an exemplary position. The receiver 30 may be configured to produce an audible signal perceptible to the wearer of the baseball hat 35 in response to receiving a coded signal transmitted by the transmitter 20. The position of the receiver 30 may be within a sweatband 37 that commonly runs around the bottom of a baseball cap. The receiver 30 may be sized to fit substantially within the sweatband 37 and may be held in place by clips (not shown) or other type of fastener. The receiver 30 may be advantageously positioned on the side of the head, the back of the head, or the top of the head. Positioning may depend on safety considerations and/or audio reproduction considerations. The receiver 30 may include a bone conductor 32 configured to transduce signals to produce a perceptible audible signal to the wearer of the baseball hat 35. A technical benefit of using bone conduction technology to reproduce audio content is that typically only the wearer of the bone conductor receiver will be able to hear the audio produced (or transduced) by the bone conductor, even if the volume is turned up very high. Hence, there is little to no likelihood that another player, other than the player wearing the receiver 30, will be able to hear the information provided from the audio file and receiver 30.

Figure 5:
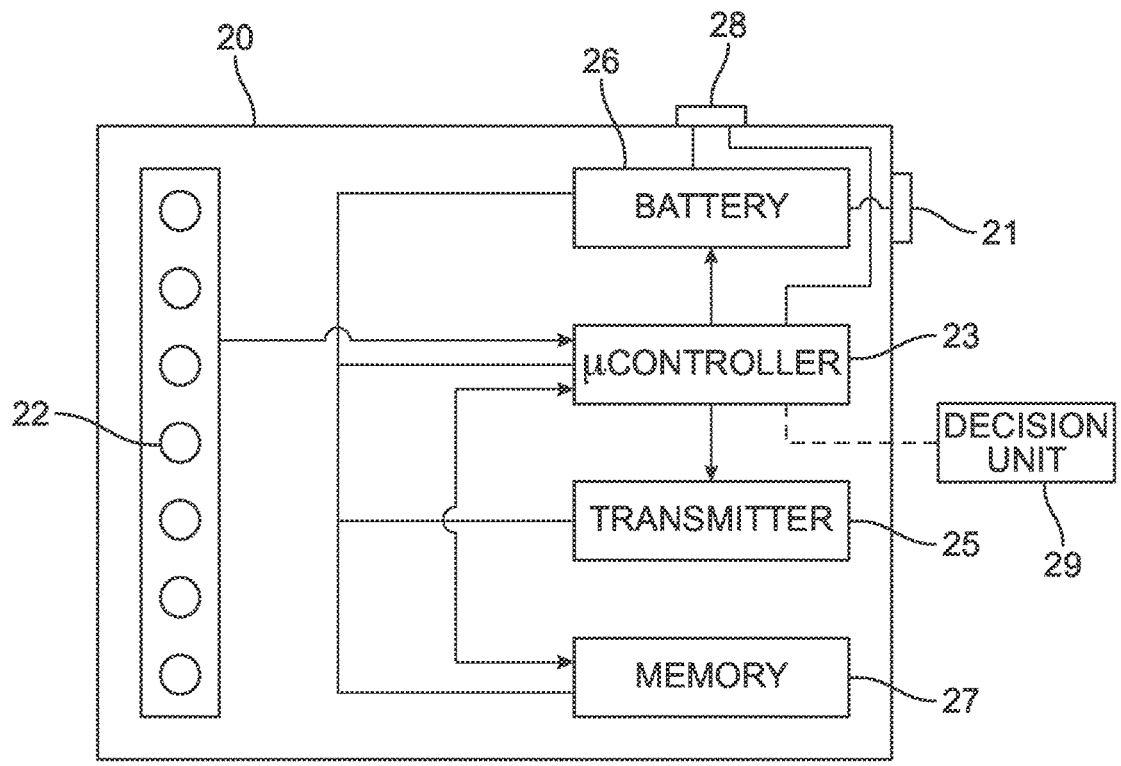
FIG. 5 is a block diagram of a transmitter constructed in accordance with embodiments of the present disclosure.

FIG. 5 shows a block diagram of an exemplary embodiment of a transmitter 20 constructed in accordance with the present disclosure. The transmitter 20 includes a rechargeable battery 26 that acts as the power source for the components of the transmitter 20. The battery 26 may be recharged through a port 28, such as but not limited to a micro-Universal Serial Bus (USB) port. The battery 26 may also be recharged using wireless charging. The battery 26 may be a non-rechargeable, replaceable battery in other implementations. The transmitter 20 may be turned on via an externally actuatable power switch 21. The switch 21 may be a slide switch, a push button switch, or other type of switch. However, in certain embodiments, the transmitter does not have a power switch and is always ready to transmit as long as the battery 26 is charged. A conventional microcontroller 23 may be coupled to the battery 26, a wireless transmitter unit 25 and a memory 27, as well as the input buttons 22. The wireless transmitter unit 25 can have an internal antenna (not shown) or be connected to an external antenna (not shown) extending from the transmitter 20. The microcontroller 23 may also connected to the port 28 to allow programming and external communication. In operation, once the transmitter 20 is powered on via power switch 21, a user depresses one of the buttons 22. The user may be a catcher 10, manager, pitching coach, or other user who may provide pitch selection signals.

The microcontroller 23 determines when one of the buttons of the input buttons 22 has been depressed, which corresponds to a pitch type selection. The microcontroller 23 may either use its own internal memory, or the external memory 27 to function as a signal generator to generate a coded signal, which can simply be the code for a "1", "2", "3", etc. Other encoded signals may be stored in the memory. The encoded signal does not require a long string or sequence of characters encoding an audio file. Instead, the encoded signal may include a set of values that reference a corresponding audio file. For example, the transmitter may map buttons or a sequence or combination of buttons to values representing corresponding audio files stored in the memory of the receiver 30.

The transmitter 20 may also be optionally coupled to a decision unit 29 in some implementations. The decision unit 29 may be configured to output a decision signal to the microcontroller 23 that may bypass the functionality of the buttons 22. The type of decision signal received may depend upon the type of decision unit 29 being utilized. The microcontroller 23 of the transmitter 20 may be configured to receive the decision signal from the decision unit 29 and to generate and transmit a coded signal to the receiver 30. In an example implementation, the decision unit 29 is an electronic line calling device that may include one or more cameras and/or other sensing means to detect that a ball is either in or out of bounds. The transmitter 20 may be coupled to the electronic line calling device and may receive a decision signal from the line calling device indicating whether a ball was in or out of bounds. The transmitter 20 may generate an encoded signal corresponding to that decision signal and transmit the encoded signal to the receiver 30 using the transmitter unit 25. In this example, the receiver 30 may be worn by a line judge. The receiver 30 may decode the received encoded signal, selected the appropriate audio file from memory, and output the audio file to the line judge using conductive means or other means. Example embodiments of the receiver are detailed in the following paragraphs.

Figure 6:
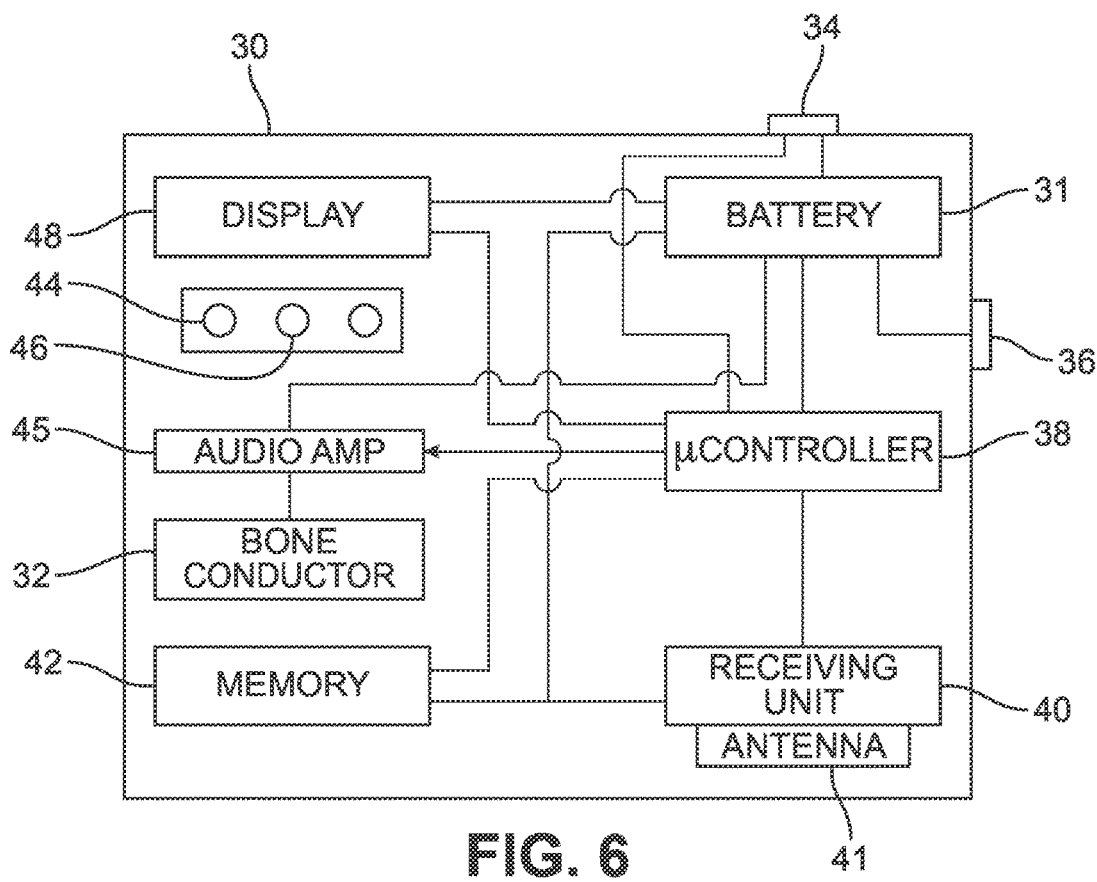
FIG. 6 is a block diagram of a receiver constructed in accordance with embodiments of the. present disclosure.

FIG. 6 shows a block diagram of an exemplary embodiment of a receiver 30 constructed in accordance with the present disclosure. The receiver 30 includes a rechargeable battery 31, although other types of batteries can be used. The battery 31 may be recharged through a port 28, as such as a micro-USB port 28. The port 28 may also be used as a conduit to program the microcontroller 38 and to store audio files within the memory 42. A display 48, such as but not limited to a light emitting diode (LED) display, may be provided in certain embodiments. The display enables a visual interaction with a user, such as when programming the receiver 30, or selecting a subset of audio files to use. For example, audio files 80a-80d shown in FIG. 7A may be used by a first pitcher Smith, while audio files 80e-80h may be used by a second pitcher Jones. These different subsets can be selected through control buttons 46.

A conventional wireless signal receiving unit 40 is provided and controlled by the microcontroller 38. The receiving unit 40 may receive the coded signals from the transmitter 20, which may include an indication of a pitch type selected. The receiving unit 40 may include an antenna 41, which may take different forms. For example, the antenna 41 can be a conventional chip antenna, as is commonly used in other applications. In other embodiments, the antenna 41 may be a longer antenna and extend along the body of the receiver 30. In operation, the microcontroller 38 may be configured to decode a received coded signal from the receiving unit 40 and send a signal through an audio amplifier 45 to cause the bone conductor 32 or other sound reproducer (or "audio reproduction transducer") to play the particular audio file that corresponds to the pitch type selected, as discussed below.

Figure 7A:
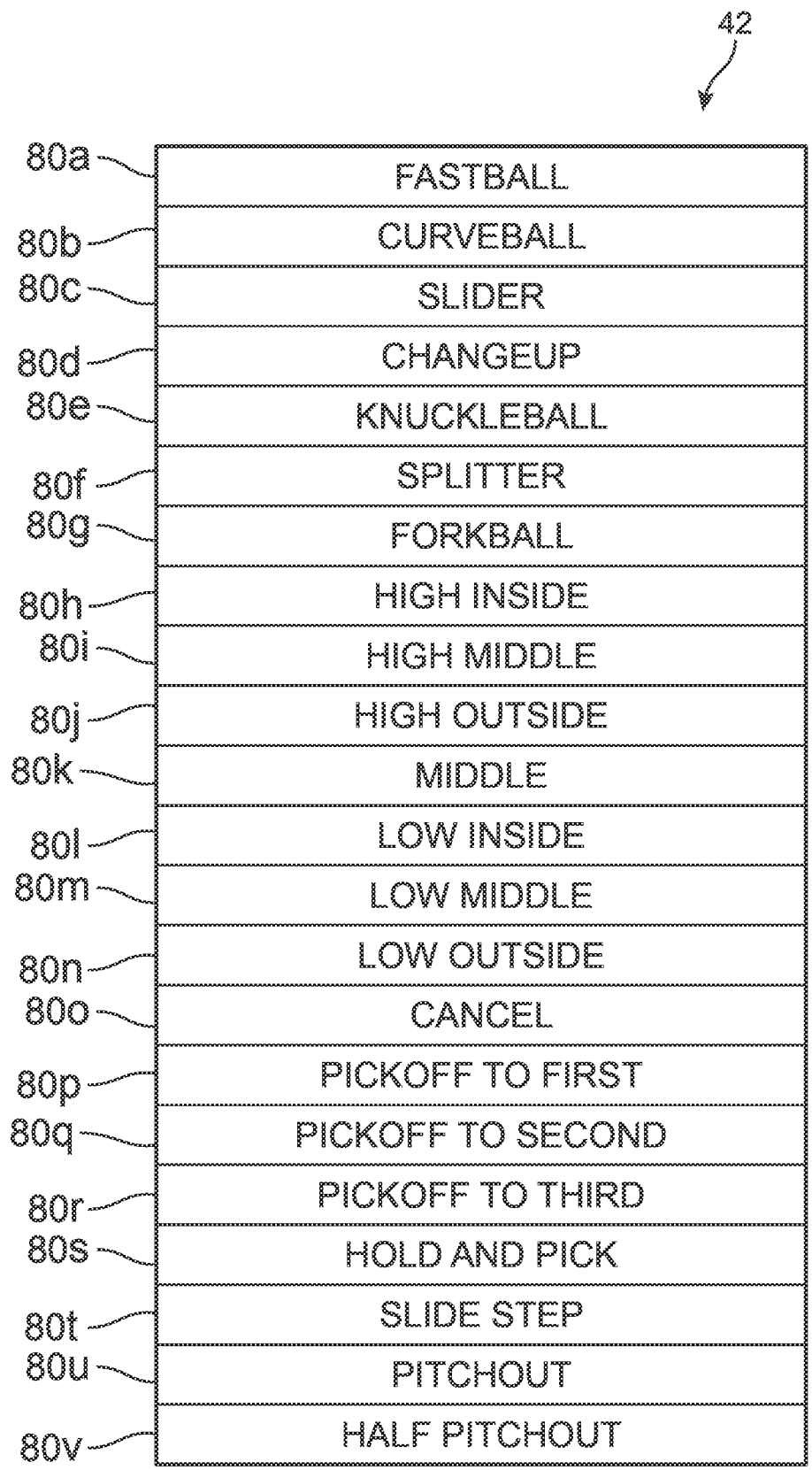
FIG. 7A is a schematic depiction of audio files stored in memory locations in accordance with embodiments of the present disclosure.

In the exemplary embodiments, the receiver 30 may have a plurality of audio files 80a-80v that are stored in memory 42. These audio files are played by the receiver in accordance with the received coded signal. A schematic depiction of an audio file listing stored in the receiver memory 52 is depicted in FIG. 7A. In operation, the receiver 30 receives a coded pitch selection signal, such as a "1", reflecting the "1" button of the buttons 22 being depressed by the user of the transmitter 20. In this particular example implementation, this particular signal can indicate that the pitch type selected is a "fastball". When the receiver 30 receives the coded signal, the microcontroller 38 of the receiver 30 decodes the signal and determines that the signal is a "1" signal and will reproduce the audio file from file location "1". In this example, the audio file 80a at the "1" location corresponds to "fastball", so the word "fastball" is audibly reproduced by the receiver 30 through the bone conductor 32. In other implementations, the buttons 22 of the transmitter 20 may be mapped to different set of pitch types, and the corresponding audio files associated with these pitch types may be stored in the memory 42 of the receiver 30.

The use of coded signals that are decoded and reproduced according to stored audio files has a number of significant advantages over other communication systems that are employed in sports. For example, a radio receiver, such as used in football helmets to call in plays, employs someone speaking into a microphone for transmission of the voice directly to the quarterback. This is impractical in baseball, as the catcher cannot speak the name of the pitch without revealing the pitch to the batter. Rather, in accordance with the present disclosure, the simple pressing of a single button will convey the pitch selection to the pitcher. Furthermore, security is assured more easily through the coding of the pitch selection than can be achieved through wireless voice communications.

Security of communication is a major concern for sports teams. In certain embodiments, a radio communication protocol is employed that provides secure messaging between all parts of the system, is protected from radio noise and interference with other team's equipment or tampering. Each team will use its own unique key shared across the whole team system for encryption and identification purposes. The transmitter 20 and the receiver 30 communicate through a radio communication protocol that may include, but is not limited to, one of the following technologies: addressed and broadcast messaging; delivery confirmation; data integrity check; data encryption using one of the standard algorithms (RC4, AES, etc.) or its modification; a hopping code; Hopping Frequency Spread Spectrum (HFSS); radio channel occupancy monitoring; backup communication channel or other such technologies well-known to those of skill in the art.

Storage of the audio files in the receivers 30 allows for a number of advantages of the present communication system. As is well-known, baseball is an international sport such that players in the major leagues come from many different countries and speak many different languages. Translators have been used at the pitching mound for conferences. However, employing audio files as in the present invention, permits the audio files to be in a number of different languages. Each receiver 30 may include audio files in a language appropriate for the user. In one example, a Japanese-speaking pitcher may have a receiver that includes Japanese language audio files. The catcher in this example speaks Spanish and does not speak Japanese. However, the Spanish-speaking catcher may press the "1" button on his transmitter 20 to send a "fastball" pitching instruction to the pitcher, and the receiver 30 of the pitcher provides the pitching instruction for fastball in Japanese to the pitcher in this example. A team may include multiple players that speak different languages, and each receiver 30 may be configured to include audio files associated with the preferred language of the user of that receiver 30.

Wearing a receiver 30 is not limited to pitchers. It is desirable for the catcher 10 to have a receiver 30 installed in his helmet so that he will confirm the pitch type that he transmitted to the pitcher. Otherwise, he may have accidentally pressed "1" for fastball, thinking that he pressed "2" for curveball, and without the audible feedback provided by an installed receiver, will be unprepared for a fastball and may miss the pitch or be injured. Further, other defenders in the field may have receivers 30 installed in their hats. Traditionally, by knowing which pitch is about to be thrown, fielders will shift their positions slightly to better anticipate where the batter is likely to hit the ball.

Analogously, transmitters 20 are not limited to catchers 10. They can also be used by people in the dugout, such as the manager or pitching coach to call the pitches. This may be especially helpful when an inexperienced catcher 10 is playing, or an unfamiliar batter is at the plate and the manager wants specific pitches to be called. The buttons the manager or pitching coach presses can play the same or different audio files than the ones the catcher 10 uses. For example, the catcher may press one of four buttons, corresponding to four different pitch audio files 80 in the receiver 30. The manager or pitching coach may have four or more additional buttons to use, that will correspond to additional audio files (e.g., audio files 5-9) in the pitcher's receiver 30. In addition to the names of pitches, the audio files 80 could also be used to produce audible instructions or reminders to the pitcher, such as "keep your front shoulder in as you deliver the pitch." If major league rules were to prevent such use of the system, the system may be easily locked to prevent this usage, and the receivers 30 may just have pitching instructions stored and reproducible in the receivers 30. Additionally, one or more buttons 22 may be associated with other types of instructions. For example, one or more buttons 22 may be associated with instructions used to tell the pitcher to throw a pitchout or to throw over to first base instead of throwing a pitch.

The receiver 30 has a number of audio files 80a-80v at addressable storage locations, as depicted schematically in FIG. 7A. Each audio file 80 can be recorded in a language that is specific to the person listening to the audio file 80. For example, if the pitcher is Korean, the receiver 30 for that pitcher will contain audio files recorded in Korean. If Japanese, they will be recorded in Japanese, and so on. It is also, possible, of course, to provide audio files 80 in which some of the audio files are in one language, and others are in a different language. When multiple receivers 30 are employed but with different stored languages, it is important that the audio files 80a-80v in a first language in a first one of the receivers 30 are stored at the same addressable storage locations as the audio files 80a-80v in a second language in a second one of the receivers 30, where the audio files 80a-80v correspond to each other. For example, "curveball" recorded in English and stored as audio file 80a in a first one of the receivers 30, will correspond to "curva" recorded in Spanish and stored as audio file 80a in a second one of the receivers 30. This correspondence allows the transmitter to broadcast the same coded signal to all of the receivers 30, which will then play the same instruction (pitch type, for example) at each of the receivers 30 in whatever language the instructions are recorded and stored in that receiver 30. There is no limitation on the number of receivers 30 that are able to receive the coded signal, with each of these receivers 30 being able to have its instructions recorded in a different language from the rest of the receivers 30.

Figure 7B:
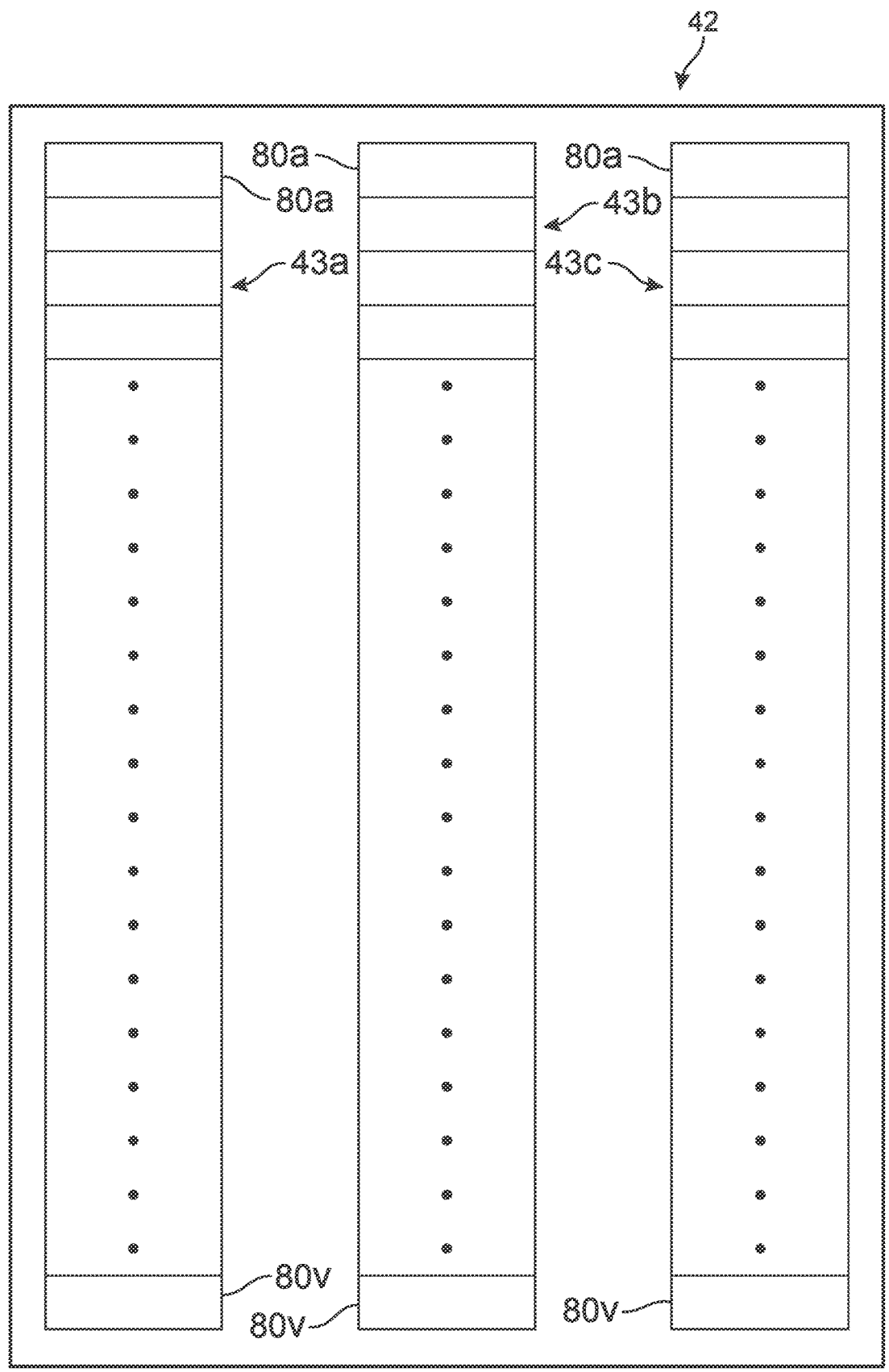
FIG. 7B is a schematic depiction of audio files stored in folders in memory locations in a single receiver in accordance with embodiments of the present invention.

FIG. 7B depicts the memory 42 in accordance with other embodiments of the present invention. The memory 42 includes a plurality of folders 43. Each folder 43 contains the audio files 80a-v but in different languages respectively. Folder 43a may contain English language audio files 80a-v, folder 43b may contain Spanish language audio files 80a-v, folder 43c may contain Japanese audio files 80a-v, and so on. Corresponding audio files 80a-v have the same meaning across the folders 43, such that audio file 80a of folder 43a contains the word "curveball", the audio file 80a of folder 43b contains the word "curva", and so on for each of the different languages stored as audio files in the memory 42. Through a special button pressing sequence (such as through buttons 102 and 104 in the embodiment of FIGS. 9A and 9B, or other means), the receiver 30 (or 100 in FIGS. 9A and 9B) may be configured to output audio in a selected language. After the language is selected at the receiver 30 or receiver 100 to configure the receiver, the receiver 30 or receiver 100 will refer to the proper folder upon receipt of a coded signal. For example, if the receiver 30 or 100 has been configured to output Spanish audio, after decoding the signal from the transmitter 20, the receiver 30 or receiver 100 will refer to folder 43b and output the audio for the word "curva" when the coded signal is for audio file 80a. The output language can be simply changed by the user by changing the folder 43 to re-configure the receiver 30 or receiver 100. In these embodiments, each receiver 30 or receiver 100 can be set to different languages by the wearer without having to re-connect the receiver 30 or receiver 100 to a computer to change the audio files 80a-v stored in the memory 42 in order to change the language.

The set of audio files 80a-80v can also be recorded to correspond to the different pitch repertoires that individual pitchers possess. For example, pitcher Jones may throw a fastball, curve, slider and changeup, while pitcher Smith may throw a fastball, knuckleball, splitter and changeup. The audio files stored in the receiver 30 worn by pitcher Jones will have the audio file corresponding to the second pitch selection signal sent by a transmitter 20 be recorded to say curveball, for example, when the second button 22 on the transmitter 20 is depressed by the catcher 10. However, when the same second button 22 is depressed when pitcher Smith is on the mound, the audio file corresponding to the second pitch selection signal will have the audio file recorded to say knuckleball. Hence, the same transmitter 20 can be used to send the same encoded signals. These encoded signals merely indicate which audio file in a receiver 30 will be played. Versatility is provided by the different audio recordings in the same audio slots from receiver 30 to receiver 30. Making audio recordings is readily accomplished through a computer (not shown) or other means to create audio files that are stored in the receiver 30 in audio slots that correspond to the different received pitch type signals from the transmitter 20. The receiver 30 can be connected to the computer and recorded audio files in a folder can simply be dragged into a file or folder of the receiver 30.

In addition to pitch types, the audio files 80a-80v can include other types of relevant information that can be played by a receiver 30. For example, as will be described later with respect to the transmitter 20, in addition to pitch type, the desired location of the pitch ("pitch location") can be stored as an audio file 80a-80v and reproduced at a receiver 30. Also, if the catcher changes his mind after making a selection, the catcher may hit a cancel button (described in the embodiment of the transmitter 20 of FIG. 10) that plays the audio file 80a-80v containing the word "cancel". Other examples of audio files 80a-80v are so-called "running game" signals that include pitchout, slide step, half pitchout, etc. Such running game signals are typically called from the dugout by a coach. In the present disclosure, a second transmitter 20 can be used to call the running game signals if the catcher is calling pitches on the field. In other embodiments, such as the embodiment of a transmitter depicted in FIG. 12, the pitch types, the pitch locations, and the running game are all called on the bench.

An advantageous feature of the receiver 30 provided in certain embodiments is a repeat button 44 (FIG. 6) that will repeat the playing of the audio file 80-80v, in the event that the pitcher, in the heat of competition, desires a reminder of the pitch type that was called. Also, for player comfort, volume control is also provided at the receiver 30 in certain embodiments.

In order for the catcher 10 not to have to memorize which audio files for each of the individual pitchers correspond to which buttons 22 on the transmitter 20, an overlay (not shown) can be provided for each pitcher, that labels each of the buttons 22 with the corresponding pitch types in each pitcher's repertoire, and hence, that pitcher's audio files stored in the pitcher's receiver 30.

Figure 8A:
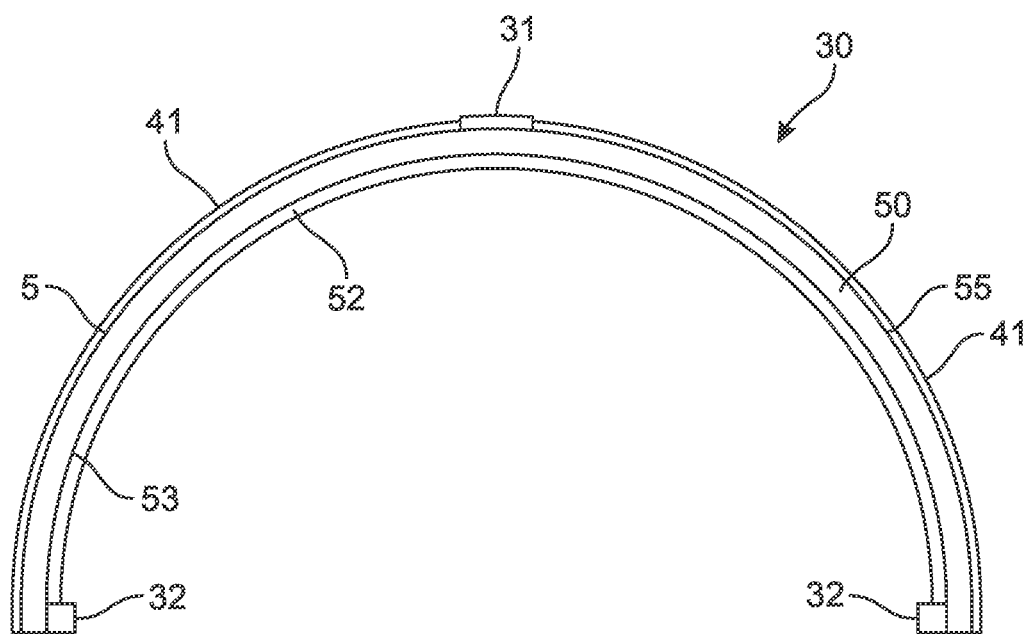
FIGS. 8A and 8B depict another embodiment of the receiver in isolated perspective view and in phantom side view installed in a hat, respectively.
Figure 8B:
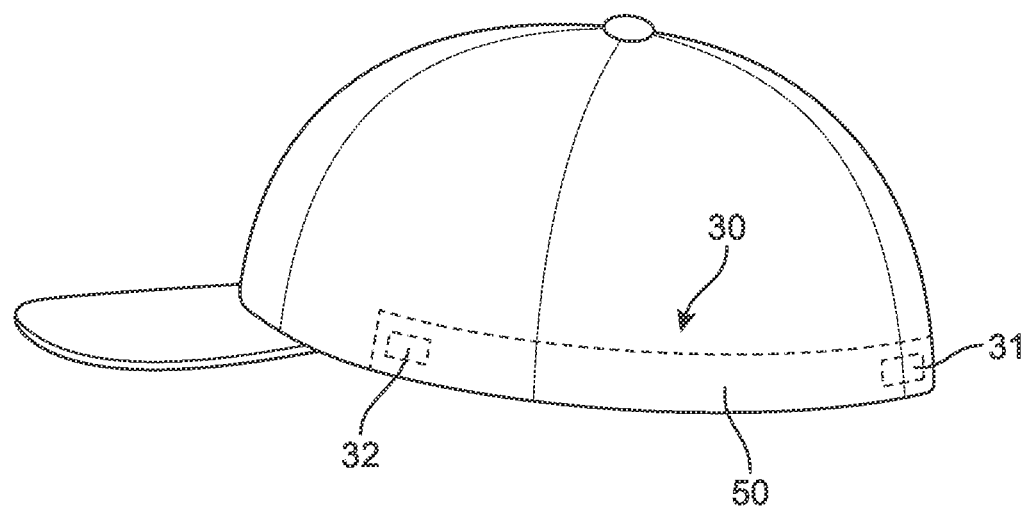

FIGS. 8A and 8B depict another embodiment of a receiver 30 constructed in accordance with the present disclosure, in perspective isolated view and in phantom view installed in a hat, respectively. The receiver 30 in FIG. 8A is seen to be shaped as a band 50 that is designed to act as a substrate and extend from above one ear, around the back of the head, to above the other ear, in an approximately semi-circular or semi-oval shape similar to the shape of the rim of the back half of a baseball cap. In certain embodiments, the band 50 may be made of a skin-safe rubber that will not irritate the skin of most people. The band 50 may be sized and shaped to fit within the band of a baseball cap, as seen in FIG. 8B, and gently conform to the skull of the wearer to provide and comfortable and secure fit. At the same time, the band 50 assures that the multiple bone conductors 32 are properly positioned on the wearer's skull such that good conduction of the audio signal is provided to the wearer. Multiple bone conductors 32 can increase the volume of the audio perceived by the wearer.

The band 50 acts as a substrate to carry an electronics board 31 that carries at least some of the electronic components of the receiver 30, for example, the microcontroller 38, the receiving unit 40 and the memory 42. The band 50 is configured to extend around the back of and along both lateral sides of a baseball style cap.

A longer antenna 41 may be used in this embodiment, as described earlier. This antenna 41 can extend over most of the length of the band 50 and may provide increased range of reception. Depending on a number of factors, transmission range between the transmitter 20 and the receiver 30 can be well over one hundred and fifty feet. Safety considerations are also a factor in sports equipment, and in certain embodiments, a protective material is provided that further increases the safety of the cap for wearers. Although the receiver 30 should provide some protection by dissipating some energy if a ball should strike the band 50 during play, additional protective material 52 may be provided to further soften the impact a player receives to the head. For example, a silicon rubber layer 52 can be provided on the interior surface 53 and/or the exterior surface 55 of the band 50. Cut-outs (not shown) can be provided in the layer 52 to allow the bone conductors 32 to contact the head directly.

Figure 9A:
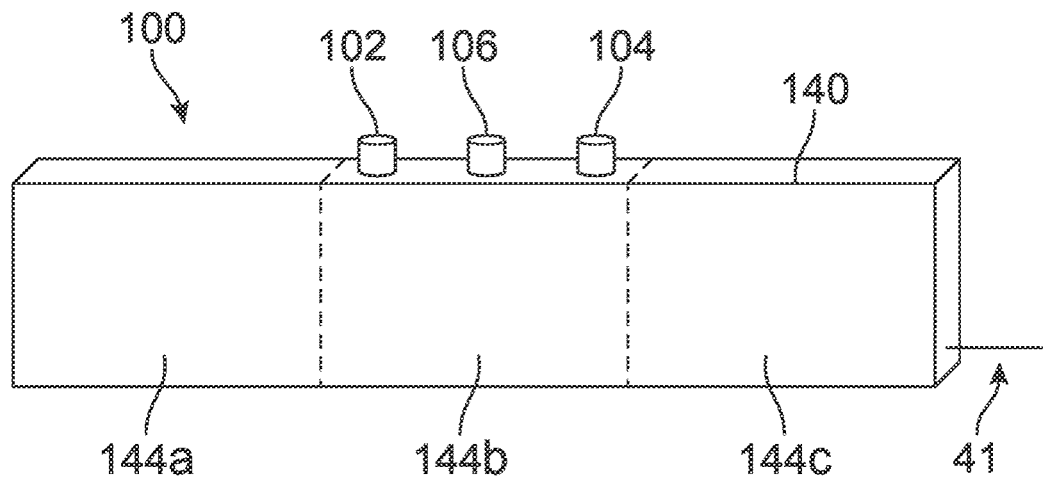
FIG. 9A is a side view of a receiver constructed in accordance with other embodiments of the present disclosure.

FIG. 9A is a side perspective view of a receiver 100 constructed in accordance with other embodiments of the present invention. It contains similar internal components as the receiver 30 of FIG. 6. However, there are certain differences in this embodiment, as will be appreciated by reference to FIG. 9B, which depicts a block diagram of the receiver 100. Referring now to both FIGS. 9A and 9B, the receiver 100 has an on/volume up button 102 and an off/volume down button 104. When installed in the sweatband of a hat, with receiver 100 oriented so that the buttons 102 and 104 are uppermost, the receiver 100 can be turned on and off easily through the fabric of the hat by depressing the buttons 102 and 104. Further, the volume can be incremented and decremented in steps by using these same two buttons 102 and 104, which control the volume after the receiver 100 has been turned on by depressing button 102. Turning off the receiver 100 requires holding down the button 104 for a longer period of time than one would use to lower the volume. The receiver 100 also has an input port 106, such as a micro USB port, that allows the receiver 100 to be charged, programmed and to store audio tracks provided through the input port 106.

Figure 9B:
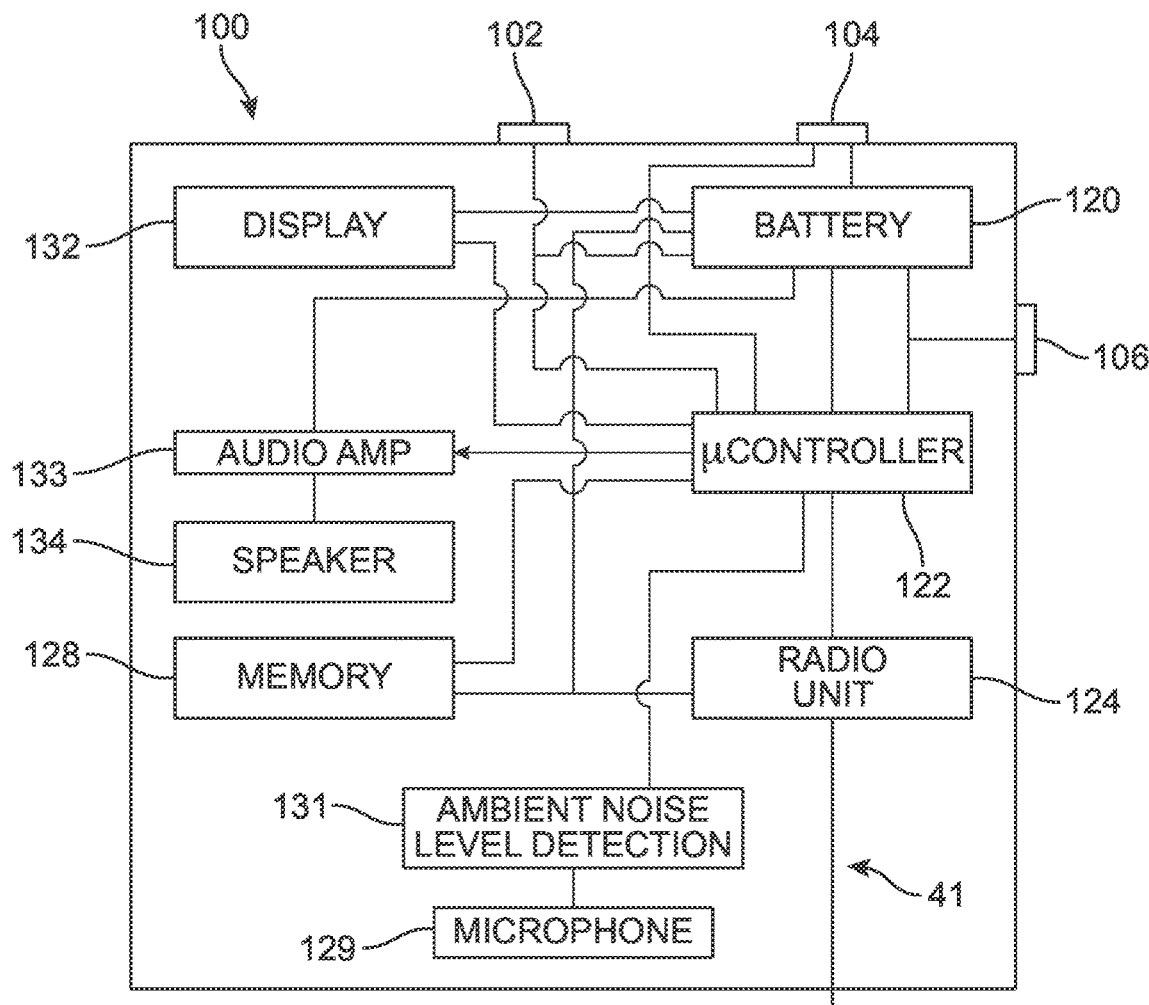
FIG. 9B is a block diagram of a receiver constructed in accordance with embodiments of the present invention.

Referring now to FIG. 9B, the receiver 100 has a rechargeable battery 120 coupled to a microcontroller 122 and a radio unit 124. In certain embodiments, the microcontroller 122 and radio unit 124 are integrated into a single unit. It is noted here that the radio unit 124, the wireless transmitter unit of FIG. 5 and the receiving unit 40 of FIG. 6 can in practice be transceivers. Each such transceiver can function solely as a receiver or transmitter. Port 106 such as a micro-USB port, is coupled to the battery 120 and the microcontroller 122, through which power and programming can be provided. The memory 128 can carry program instructions, but also stores the audio files 80a-80v. An LED 130 may be provided that shows the unit is turned on, is low on battery, among other LED functions, as is well-known. A more detailed alphanumeric display 132 is provided in certain embodiments but is not required. The receiver 100 has an audio amplifier 133 coupled to the output of the microcontroller 122. The output of the audio amplifier 133 is coupled to the speaker 134, which can be similar in construction to a smartphone speaker as an example. Such a speaker 134 is relatively thin and provides excellent sound quality and is another example of an audio reproduction transducer.

The receiver 100, in certain embodiments, may be configured to automatically adjust the volume heard by the wearer of the receiver in dependence on the ambient noise. This is especially useful when playing in stadiums with wide variations in noise intensity. After a player has set his or her preferred volume through buttons 102 and 104, a microphone 129 receives sound input from the surroundings. The output of the microphone 129 is provided to an ambient noise level determination circuit 131 that is coupled to the microcontroller 122. Such ambient noise level determination circuits 131 are well-known, used in devices such as noise reduction headphones, noise meters, etc. The ambient noise level detection circuit 131 provides a signal to the microcontroller 122 that indicates the ambient noise level. In response to this signal indicating the ambient noise level, the microcontroller 122 adjusts the volume output by the speaker 134 from the preferred volume previously set by the player. This keeps the apparent volume level for the player at a constant level in the face of changing ambient noise conditions.

As seen in FIG. 9A, the receiver 100 is generally elongate in shape, and is thin enough to fit comfortably within a baseball cap sweatband. The components of the receiver 100 are housed within a housing 140 that is made of a material resistant to moisture and corrosion and is preferably skin-safe. Silicone rubber is a suitable material, for example. To provide exceptional comfort, in certain embodiments the receiver 100 is segmented, with flex lines 142 dividing the receiver 100 into three sections 144a-c. The segmentation allows sections 144a and 144c to flex relative to section 144b, and thereby conform better to the shape of a human head. As an example, section 144a can contain the speaker 134, with the opening of the speaker 134 on the underside of the receiver housing 140. The circuit board on which the microcontroller 122 and radio unit 124 (along with LED 130) are mounted may be contained within section 144b, and the battery 120 within section 144c. A wire antenna 146 may be attached through the housing 140 to the radio unit 124.

Figure 10:
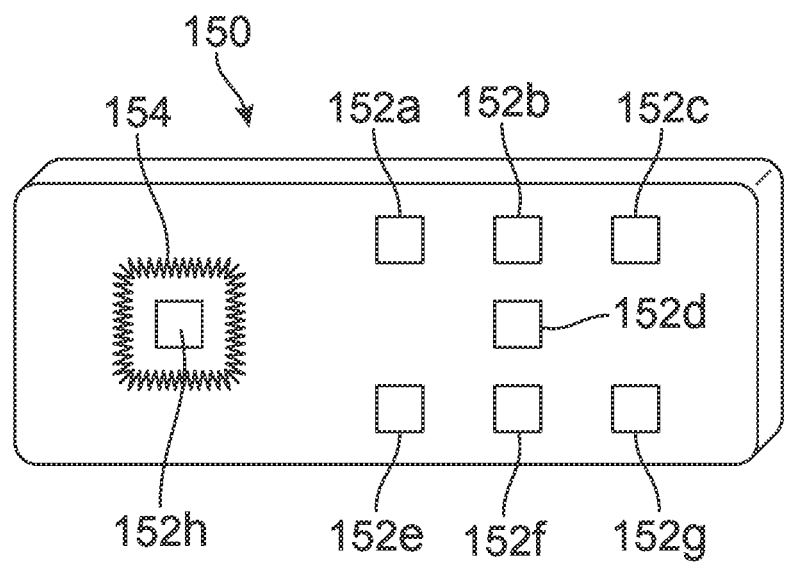
FIG. 10 is a perspective front view of a transmitter constructed in accordance with embodiments of the present disclosure.

A transmitter 150 constructed in accordance with certain embodiments of the present disclosure is depicted in front perspective view in FIG. 10. The transmitter 150 of FIG. 10 has a similar internal construction as to that shown in FIG. 5. There are eight buttons 152a-h on the transmitter 150, although more or less buttons can be provided in other embodiments. The buttons 152a-g correspond to pitch type and pitch location buttons, while button 152h is a cancel button. Since it is desirable to shield the transmitter 150 from view while pushing the buttons 152a-g, it is advantageous to have the buttons 152a-g arranged in an intuitive pattern so that a catcher can select the desired button (and hence, the desired pitch type and pitch location) just by feel. The pattern of the buttons 152a-g is a "horizontal H", with an upper row of three buttons (152a-c), a middle button (152d), and a lower row of buttons (152e-g). The space between the two rows allows a catcher to readily feel which row of buttons his thumb is on.

Figure 11:
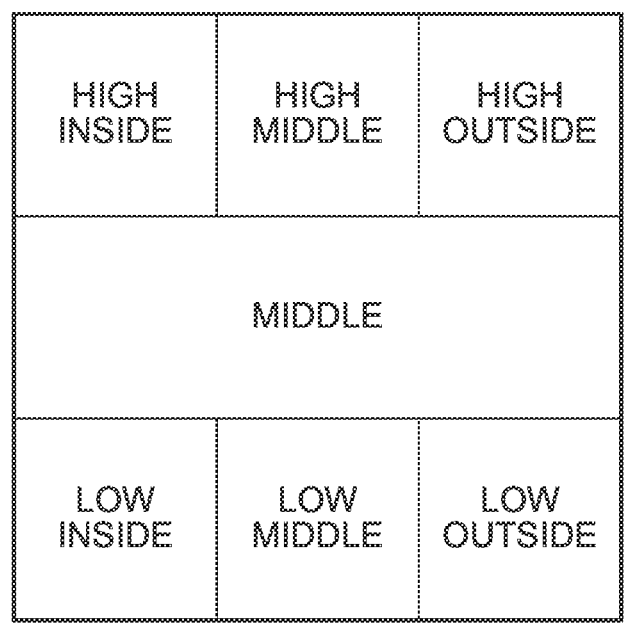
FIG. 11 is a schematic depiction of a strike zone.

Each button 152a-g represents both a pitch type and a pitch location. Discussing the pitch types first, consider buttons 152a-g to respectively correspond to pitch numbers one through seven. These pitches can be, for example, fastball, curveball, slider, changeup, knuckleball, splitter, forkball. The pitch locations correspond to physical locations, which can be compared to a strike zone shown in FIG. 11. Hence, button 152a corresponds to pitch location "high inside", button 152b to "high middle", 152c to "high outside", 152d to "middle middle", 152e to "low inside", 152f to "low middle" and 152g to "low outside".

In certain embodiments, there must be two pushes of the buttons 152a-g on the transmitter 150 before a coded signal is sent out to the receivers 100. As an operational example, assume that the catcher wants to call a fastball, high and outside. To do so, the catcher presses button 152a, corresponding to a fastball, and then presses button 152c, corresponding to high outside. Once there are two button pushes, the transmitter 150 sends a coded signal corresponding to the identifiers for the appropriate audio tracks contained in the receivers 100. Note that audio is not transmitted by the transmitter 150. The receivers 100 receive this coded signal and decode the signal. The decoded signal commands the receivers 100 to play specific stored audio tracks 80a and 80j in succession. Hence, the first button push, in certain embodiments, is the pitch type, and the second button push is the pitch location. By using the same set of buttons to input two different types of information (pitch type and pitch location), the transmitter 150 can be made much smaller, more elegant and easier to use for a catcher.

The transmitter has a cancel button 152h in the embodiment of FIG. 10. If the catcher, for example, pushes button 152a (fastball) by mistake but meant to push button 152b (curveball), he can press button 152h, which sends out a coded signal immediately (no second button push needed) to each of the receivers 100. Upon receiving the coded signal, the receivers 100 play audio track 80o, which is the word "cancel". The transmitter 150 resets after the cancel button 152h is pushed, such that the next button 152a-g that is pressed will select a pitch type again, and a second push of a button 152a-g will select a pitch location. A raised ridge 154 surrounds the cancel button 152h in certain embodiments so that this button can easily be discerned by feel and not unintentionally pushed.

The same or a similar transmitter 150 can also be used to call running game signals, such as pickoff, pitchout, hold and pick, etc. As such signals are typically called by a coach in the dugout, a separate transmitter 150 may be used from the one used for calling pitch type and pitch location. Instead of two button pushes being required to send a coded signal, however, only one button push is required. As an operational example, assume the coach wants to call a pickoff to first base. He will press button 152a, which for the running game transmitter 150, corresponds to "pickoff to first base". The running game transmitter 150 sends out a coded signal to the receivers 100, which coded signal causes the receivers to play the stored audio track 80p, which says "pickoff to first base". As with all of the receivers 100, the stored audio tracks 80a-80v can be in the native language of the wearer.

Figure 12:
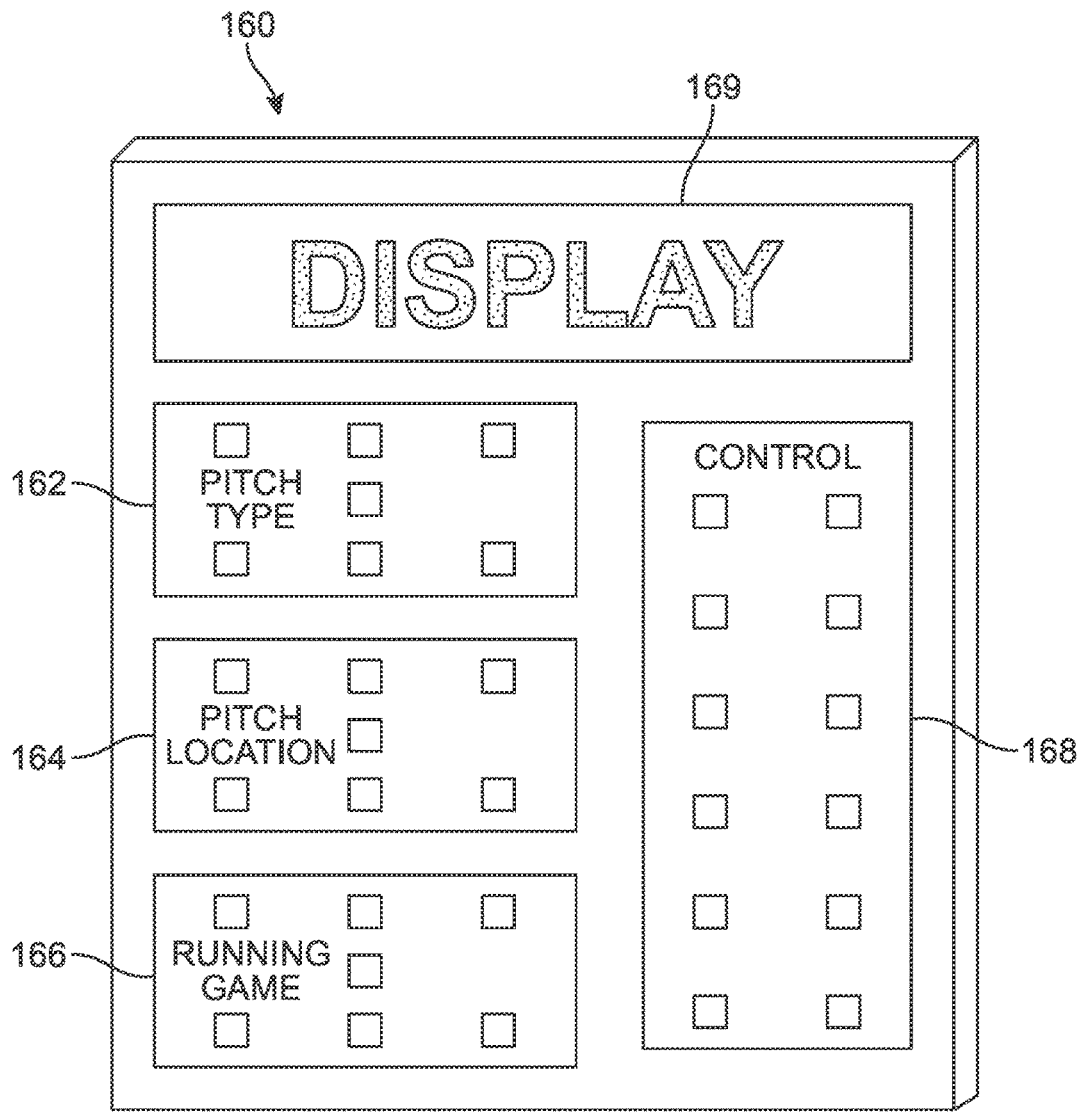
FIG. 12 is a perspective front view of a central transmitter constructed in accordance with embodiments of the present disclosure.

Another embodiment of a transmitter 160 is depicted in FIG. 12. This embodiment of a transmitter 160 is larger in size than the transmitter 150, which may be about the size of a typical business card to be easily worn on the catcher's wrist. The transmitter 160 is meant for use in a dugout, for example by a coach. Since it does not have to be worn on the wrist, additional functionality can be provided, and the extra size can be employed advantageously. For example, using a similar internal architecture of the transmitter 20 of FIG. 5, or of transmitter 150 of FIG. 9, the transmitter 160 can have separate sections for the different functions. Such sections can include, as shown in FIG. 12, but are not limited to, a pitch type section 162, a pitch location section 164, and a running game section 166. A control section 168 may also be included in certain embodiments, which can be used to control the receivers 100 on the field. A display 169 is provided in certain embodiments to allow the coach to see information, such as control information, pitch type called, pitch location called, running game signal called. Control information can include, for example, the battery level of each of the individual receivers 100, and whether an individual receiver is powered on. The volume of the individual receivers 100 can be controlled from the transmitter 160. The control information can include whether an individual receiver did not receive a coded signal. Other control information can be provided. The transmitter 160 can be in the form of a laptop, a tablet, a controller with display and hardware pushbuttons.

In certain embodiments, a transmitter 160 may be integrated with software that identifies the best pitch type and pitch location in any game situation. There are already reams of available statistics that are collected on players, including their tendencies, weaknesses and strengths. If a specific right-handed batter, with a runner on second base and one out, against this specific pitcher, tends to hit the ball toward second base with fastball that is low and outside, and that is the desired outcome, the software can identify this tendency and suggest that the coach call a fastball that is low and outside. Further, it is relatively easy to automate the pitch selection and pitch location process based on this information, with the coach merely having to update the game situation with the pitch count (how many balls and strikes), and the number of and locations of runners. So that it is not entirely predictable, an element of randomness can be used to surprise the batter with something he is not used to seeing in that game situation. For example, although the game situation may call for a fastball that is low and outside, introducing a percentage of randomness can cause the transmitter 160 to select a curveball down the middle.

Figure 13:
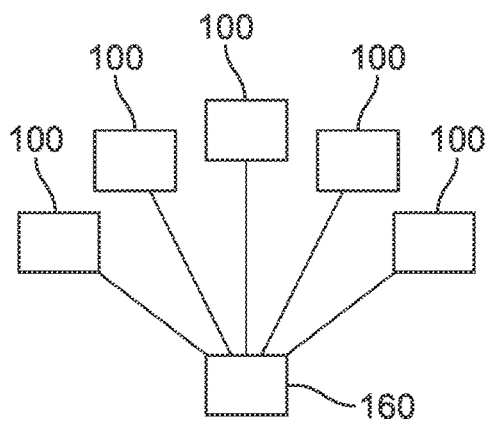
FIG. 13 is a schematic depiction of the system of the present disclosure showing a star network configuration of the system.

FIG. 13 is a schematic depiction of an implementation of a star network configuration of a transmitter and a plurality of transmitters in accordance with certain embodiments of the present disclosure. A transmitter 20, 150, or 160, is connected to each of the receivers 100 in the star network configuration. The receivers 100 and transmitter (160, for example) can employ a round trip technology to assure that messages are received by each receiver. After a receiver 100 receives a coded signal from the transmitter 160, the receiver 100 will send a signal back to the transmitter 160 to indicate that it has received the coded signal. If the transmitter 160 has not received a signal back from the receiver 100 within a certain amount of time (on the order of milliseconds), the transmitter 100 may send the coded signal again to that receiver 100. By using a star network configuration and round-trip technology, the transmitter 160 can assure that the receivers 100 will have received the coded signal from the transmitter 160.

Figure 14:
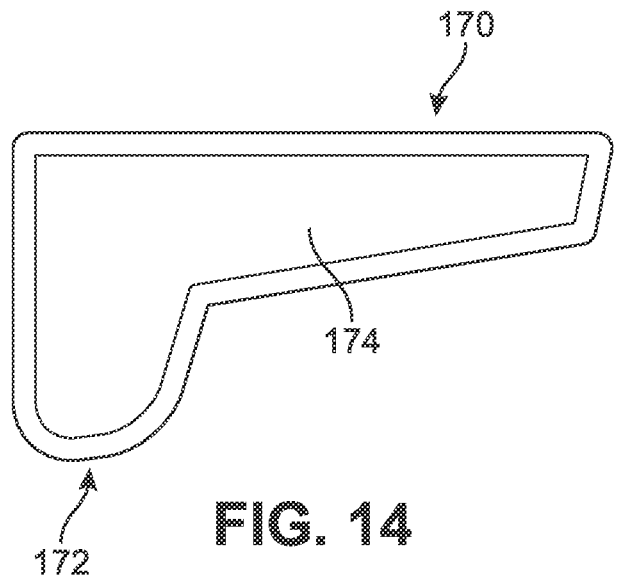
FIG. 14 is a perspective side view of a receiver constructed in accordance with certain embodiments of the present disclosure.
Figure 15:
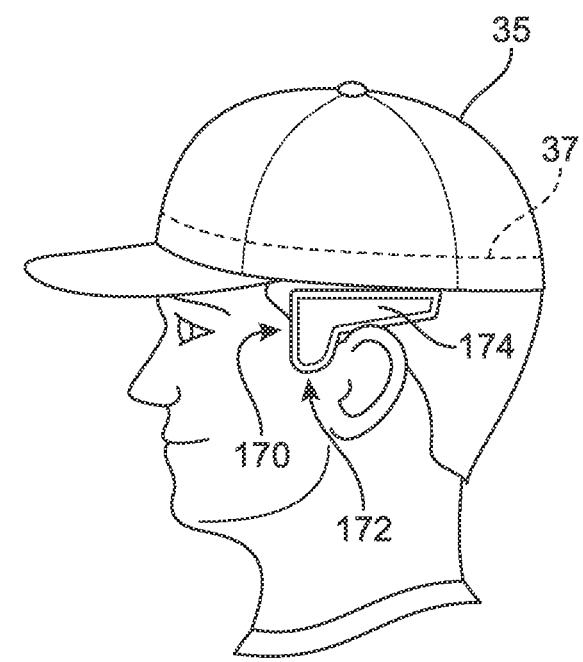
FIG. 15 is a perspective side view of the receiver of FIG. 14 mounted on the side of a baseball cap.

FIG. 14 is a side perspective view of a receiver 170 in accordance with certain embodiments of the present disclosure. The receiver 170 has the same internal components as the receiver 100. The speaker or bone conduction component is located in area 172. The receiver 170 has an advertising area 174 on its outside surface. Unlike the receivers 30 and 100, which are located within a sweatband during use, the receiver 170 is designed to be worn outside of a hat, as shown in FIG. 15. This embodiment of the receiver 170 allows a team to use the advertising area 174 to sell advertising space on the receiver 170. As television cameras often focus on the sides of player faces, this would mean that such advertising area 174 would be seen quite often on television, and a team can use this area 174 as a source of revenue. Further, this embodiment of the receiver 170 positions the speaker or bone conduction component directly in front of the ear of the player, which can improve the listening experience for certain players.

Figure 16:
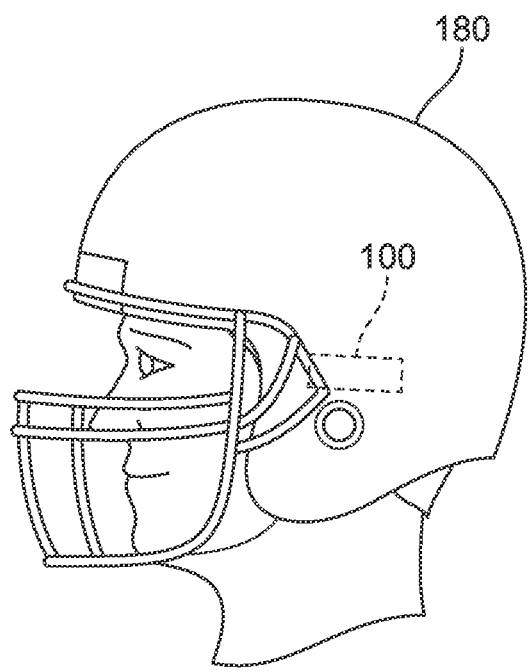
FIG. 16 is a side view of a football helmet depicting the receiver of FIG. 9A in phantom mounted within the football helmet.

FIG. 16 is a side view of the receiver 100 of FIG. 9 inserted into a football helmet 180. It is relatively easy to secure the receiver 100 between or inside the pads of the football helmet 180. Because it is so lightweight, the addition of the receiver 100 to the football helmet 180 will be unnoticed by a player wearing the helmet 180.

Although football currently uses an audio radio transmission to provide plays to the quarterback (and from the other team, to one defensive player), the use of embodiments of the presently disclosed system has some advantages to the current system. For example, providing lightweight receivers 100 reduces fatigue in players, enhancing comfort and safety. Further, every player on the team on the field will be able to simultaneously hear the play when it is called. This would eliminate the need for a huddle. Another advantage could be realized if a quarterback wore a transmitter similar to transmitter 150. Instead of calling out an audible (a changed play from that called in the huddle) at the line of scrimmage, usually limited to a single choice of play, and also alerting the defense that an audible has been called, the quarterback can use the transmitter 150. This allows the quarterback to send a coded signal silently and covertly to each of the other players on offense that causes their receivers 100 to play an audible. The defense will not be aware that an audible has been called. Further, the quarterback can select the audible from multiple choices. Another potential advantage when used in football is the possibility of speeding up play. Since huddles are not required as each player is provided with a receiver 100, the pace of the game can be increased.

Figure 17:
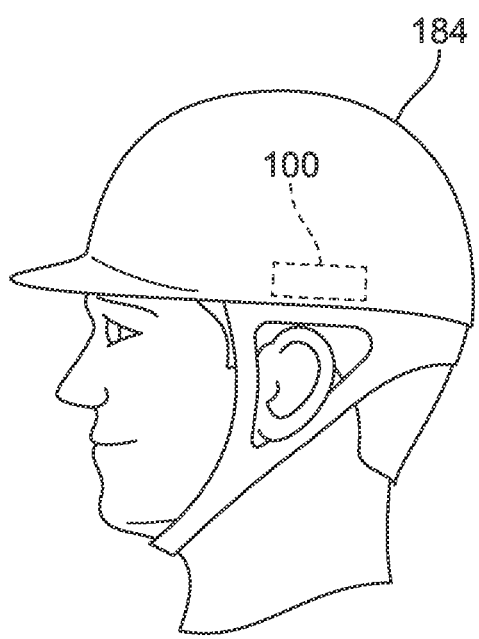
FIG. 17 is a side view of a jockey helmet depicting the receiver of FIG. 9A in phantom mounted within the jockey helmet.

FIG. 17 is a side view of a jockey's helmet 184 showing a receiver 100 (in phantom) mounted within. During a race, a jockey could be receiving instructions through the receiver 100 that helps or her with strategy during a race.

The system according to embodiments of the present disclosure allows players to communicate with each other with audible instructions, unlike previous systems in which a coach would have to vocalize instructions that are heard in radio receivers by the players in the area of competition. Hence, players on the field of competition are able to communicate without vocalization. This has the advantage of letting players, who are often the best positioned to provide in-game instructions to other players, provide those instructions where it would otherwise be impossible to do so by vocalization since the opposing team would hear that vocalization.

Figure 18:
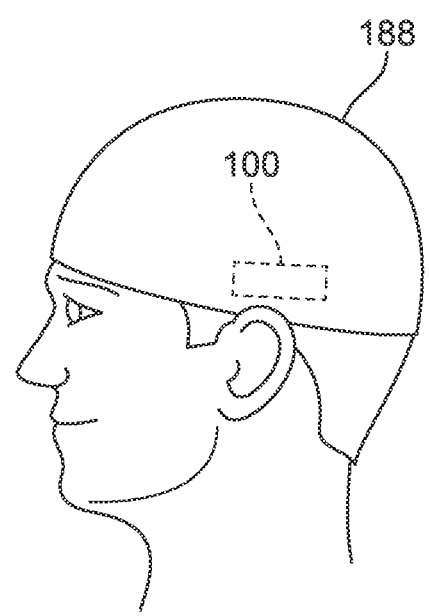
FIG. 18 is a side view of a swimmer's head wearing a swimming cap with the receiver of FIG. 9A underneath the cap.

FIG. 18 depicts a swimmer wearing a swim cap 188 with a receiver 100 (in phantom) underneath the swim cap 188. Because the swim cap 188 is meant to be worn underwater, the use of a bone conductor rather than a speaker is preferred in certain embodiments. The swimmer can hear instructions such as kick harder, slow pace, increase pace, etc.

Figure 19A:
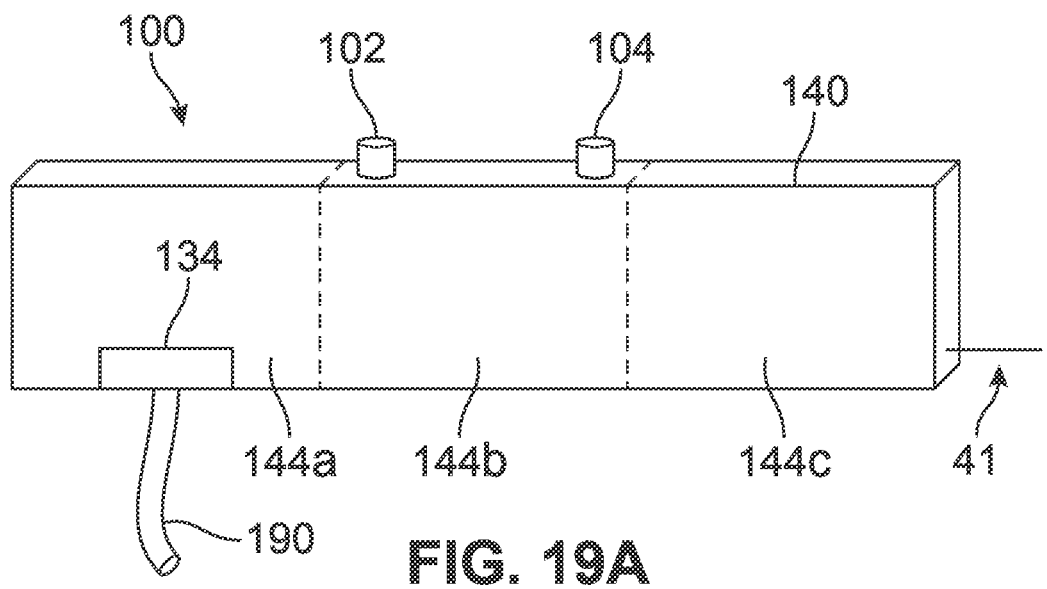
FIG. 19A is a side view of another embodiment of a receiver constructed in accordance with embodiments of the present invention.

FIG. 19A depicts another embodiment of the receiver 100. In this embodiment, an audio tube 190 is provided from which the speaker sound emanates. Such audio tubes are well-known and used by security personnel, on-air commentators, etc. The sound is directed straight into the ear canal, much like ear buds. However, an audio tube is not worn separately and supported within the ear, like an ear bud, and is therefore practically unnoticeable to the user. They are light-weight, and generally pliable, increasing comfort. By delivering sound directly into the ear canal, or at least closer to it, the embodiment of FIG. 19A can be employed in the loudest of stadiums, and also be used in quieter environments since the sound is not directed outwardly.

Figure 19B:
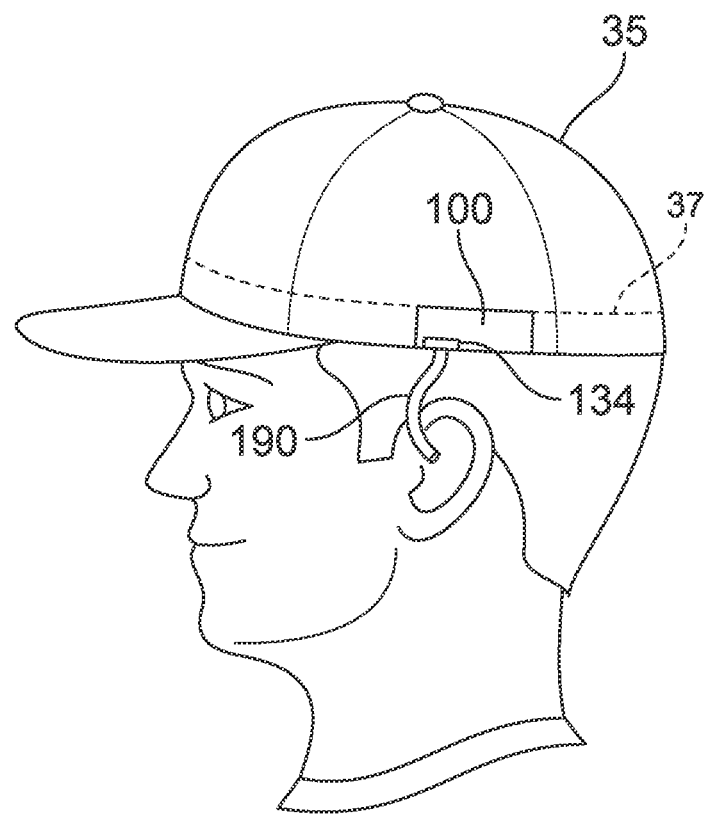
FIG. 19B is a side view of a player's head wearing a baseball cap with the receiver of FIG. 19A installed.

FIG. 19B shows the receiver 100 of FIG. 19A installed in the sweatband 37 of a cap 35 worn by a player. The audio tube 190 is shown extending from the speaker 134 into the ear lobe of the player.

The communication system described in the present disclosure thus provides secure and covert communication of instructions to an athlete, without using visual signaling that can be intercepted through video, binoculars and other methods and then decoded. Further, rather than sending audio signals, or digitized audio to the headset receivers, embodiments of the present disclosure only transmit short, coded signals (such as a number). The headset receivers already have the audio tracks stored within. Security of the transmission is thereby enhanced due to the short, bursty nature of the transmission. This also makes it easier for the headset receivers to decode the signal, rather than a complete voice audio transmission. The headset receivers can also be made lighter, and increased battery life.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure us explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principled defined herein may be applied to other aspects. Thus, the claims are not intended to be limited to the aspects shown herein but are accorded the full scope consistent with the language of the claims, wherein reference to an element in the singular is not intended to mean "one and only one: unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any are used for convenience only and do not limit the subject disclosure.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A sports instruction communication system, comprising:
   a transmitter including:
      a transmitter unit configured to transmit wireless signals, and
      a first microcontroller coupled to the transmitter unit, the first microcontroller configured to provide the transmitter unit with a selection signal to wirelessly transmit;
      a display coupled to the first microcontroller and configured to visually display a sports instruction;
      a plurality of user actuatable input elements coupled to the first microcontroller, the plurality of user actuatable input elements grouped in different sections for different respective signal types;
      wherein the first microcontroller is configured to provide the transmitter unit with the selection signal to wirelessly transmit in accordance with actuation of the user actuatable input elements, the selection signal corresponding to the sports instruction; and
   a body-worn visual receiver including:
      a receiving unit configured to wirelessly receive the selection signal;
      a display configured to visually display sports instructions; and
      a second microcontroller coupled to the receiving unit and the display, wherein the second microcontroller is configured to control the display to visually display a selected visual instruction in accordance with the received selection signal, wherein the selected visual instruction corresponds to the sports instruction.

2. The system of claim 1, wherein the different sections include at least two of pitch types, pitch locations, and running game instructions, and the selected visual instruction includes at least one of a pitch type, pitch location, and running game instruction.

3. The system of claim 1, wherein the transmitter is a tablet.

4. The system of claim 1, wherein the user actuatable input elements are depressible push buttons.

5. The system of claim 1, wherein the first microcontroller of the transmitter is configured to encode the selection signal to indicate the selected instruction, and the second microcontroller of the visual receiver is configured to decode the selection signal to determine the selected visual instruction.

6. The system of claim 1, wherein the memory has a plurality of addressable storage locations in which each visual instruction of the plurality of stored visual instructions are respectively stored at storage locations as at least one of a text file and an image file.

7. The system of claim 6, wherein the text file contains at least one word, and the display displays the at least one word when the selected stored visual instruction is the text file.

8. The system of claim 7, wherein the image file contains at least one image of a strike zone location, and the display displays the at least one image of a strike zone location when the selected stored visual instruction is the image file.

9. The system of claim 1, wherein the selected visual instruction visually displayed at the receiver contains at least one word within the selected visual instruction corresponding to the sports instruction displayed on the transmitter.

10. A baseball instruction communication system, comprising:
    a transmitter including:
       a transmitter unit configured to transmit wireless signals, and
       a first microcontroller coupled to the transmitter unit, the first microcontroller configured to provide the transmitter unit with a selection signal to wirelessly transmit;
       a display coupled to the first microcontroller and configured to visually display a baseball instruction;
       a plurality of user actuatable input elements coupled to the first microcontroller, the plurality of user actuatable input elements grouped in different sections for different respective signal types;
       wherein the first microcontroller is configured to provide the transmitter unit with the selection signal to wirelessly transmit in accordance with actuation of the user actuatable input elements, the selection signal corresponding to a baseball instruction; and
    a body-worn visual receiver including:
       a receiving unit configured to wirelessly receive the selection signal;
       a memory configured to contain a plurality of stored visual baseball instructions;
       a display configured to display visual instructions; and
       a second microcontroller coupled to the second receiving unit, the memory and the display, wherein the second microcontroller is configured to control the memory and the display to display a selected visual instruction in accordance with the received selection signal, wherein the selected visual instruction corresponds to the baseball instruction.

11. The system of claim 10, wherein the transmitter is further configured such that a first actuation of one of the input elements selects a first visual baseball instruction corresponding to a first pitch instruction and a subsequent actuation of one of the input elements selects a second visual baseball instruction corresponding to a second pitch instruction, wherein the first and second pitch instructions are reproduced simultaneously on the display.

12. The system of claim 11, wherein the first pitch instruction is a pitch type and the second pitch instruction is a pitch location.

13. The system of claim 10, wherein the first microcontroller is further configured to encode the selection signal and the second microcontroller is configured to decode the selection signal.

14. The system of claim 10, wherein the different sections include at least two of pitch types, pitch locations, and running game instructions, and the selected visual instruction includes at least one of a pitch type, pitch location, and running game instruction.

15. The system of claim 14, wherein the transmitter is a tablet.

16. A baseball instruction communication system, comprising:
a transmitter including:
a first microcontroller;
a plurality of user actuatable input elements coupled to the first microcontroller, the plurality of user actuatable input elements grouped in different sections for different respective baseball instruction types;
a transmitter configured to wirelessly transmit a selection signal to a visual display receiver in response to human input through the input elements, the selection signal corresponding to a baseball instruction;
a display coupled to the first microcontroller and configured to visually display a selected at least one baseball instruction; and
a display receiver configured to receive the selection signal from the transmitter and including:
a memory storing a plurality of visual baseball instructions as text;
a microcontroller that retrieves the text of the visual baseball instruction from the memory based on the selection signal; and
a display on which the text of the visual baseball instructions are reproduced in response to receiving the selection signal from the transmitter.

17. The baseball instruction communication system of claim 16, wherein the different sections include at least two of pitch type, pitch location and running game signals.

18. The baseball instruction communication system of claim 17, wherein the display receiver is configured to display pitch type and pitch location simultaneously.

19. The baseball instruction communication system of claim 18, wherein the pitch includes pitch type and pitch location and two input elements are actuated sequentially on the transmitter to select a pitch type and pitch location.

20. The baseball instruction communication system of claim 19, wherein the display receiver is configured as a wrist-worn receiver.

* * * * *